United States Patent
Schneider

(10) Patent No.: US 10,118,185 B2
(45) Date of Patent: Nov. 6, 2018

(54) ISOLATED BEARING VISCOUS SPEED RETARDING DEVICE FOR ROTARY NOZZLES

(71) Applicant: STONEAGE, INC., Durango, CO (US)

(72) Inventor: Joseph A. Schneider, Durango, CO (US)

(73) Assignee: STONEAGE, INC., Durango, CO (US)

( * ) Notice: Subject to any disclaimer, the term of this patent is extended or adjusted under 35 U.S.C. 154(b) by 353 days.

(21) Appl. No.: 14/745,762

(22) Filed: Jun. 22, 2015

(65) Prior Publication Data

US 2016/0008826 A1    Jan. 14, 2016

Related U.S. Application Data

(60) Provisional application No. 62/024,408, filed on Jul. 14, 2014.

(51) Int. Cl.
| | | |
|---|---|---|
| *B05B 3/00* | (2006.01) | |
| *F16D 57/02* | (2006.01) | |
| *B05B 3/06* | (2006.01) | |

(52) U.S. Cl.
CPC ............. *B05B 3/005* (2013.01); *F16D 57/02* (2013.01); *B05B 3/06* (2013.01)

(58) Field of Classification Search
CPC ....... F16D 57/02; F16D 57/007; B05B 3/005; B05B 3/06; B05B 3/02; B05B 3/066;
(Continued)

(56) References Cited

U.S. PATENT DOCUMENTS

| | | | | | |
|---|---|---|---|---|---|
| 2,057,842 | A | * | 10/1936 | Nielsen | F28G 3/14 |
| | | | | | 131/246 |
| 4,088,191 | A | * | 5/1978 | Hutchison | E21B 37/00 |
| | | | | | 166/223 |

(Continued)

FOREIGN PATENT DOCUMENTS

| | | | |
|---|---|---|---|
| CN | 103836067 | * | 6/2014 |
| DE | 202013100985 | * | 7/2013 |
| WO | WO 2014/017052 | | 1/2014 |

OTHER PUBLICATIONS

English machined translation of CN-103836067, Description only.*
(Continued)

*Primary Examiner* — Robert A. Siconolfi
*Assistant Examiner* — San M Aung
(74) *Attorney, Agent, or Firm* — Greenberg Traurig, LLP

(57) ABSTRACT

A speed retarding device for a rotary nozzle includes a hollow cylindrical housing and a rotatable tubular shaft rotatably carried by the housing. The shaft has an enlarged drag sleeve portion carried in the housing and a shaft end extending through at least one end of the housing to receive a rotary nozzle thereon. A pair of support bearings support the drag sleeve portion of the shaft in the housing. An annular inner seal between each of the support bearings and the drag sleeve portion defines a cavity within the housing receiving a viscous fluid confined within the cavity. The support bearings are separated from the cavity confining the viscous fluid and an outer annular seal on the shaft adjacent each support bearing prevents environmental contamination such as water and debris from entry into the support bearings.

20 Claims, 3 Drawing Sheets

(58) Field of Classification Search
CPC ......... B05B 3/14; B05B 3/0445; B05B 3/003;
B05B 3/006; B05B 3/026; B05B 3/00;
B05B 1/3046; B05B 1/14; B05B 13/06;
B05B 9/0495; C23C 28/00; C23C 28/322;
C23C 28/345; E21B 37/00; E21B
41/0078; F16C 33/76; F16C 33/78
USPC .......... 188/296, 184–185; 293/227, 252, 258
See application file for complete search history.

(56) References Cited

U.S. PATENT DOCUMENTS

| | | | | |
|---|---|---|---|---|
| 4,632,576 | A * | 12/1986 | Neal ...................... | B65G 39/09 384/537 |
| 5,058,806 | A | 10/1991 | Rupar ........................... | 239/205 |
| 5,503,334 | A * | 4/1996 | Pacht ...................... | B05B 3/003 239/251 |
| 5,909,848 | A | 6/1999 | Zink ............................. | 239/252 |
| 5,947,387 | A * | 9/1999 | Zink ...................... | B05B 3/066 239/227 |
| 5,964,414 | A * | 10/1999 | Hardy .................... | B05B 3/005 239/252 |
| 6,027,040 | A * | 2/2000 | Frye-Hammelmann ..................... | B05B 3/006 239/252 |
| 6,059,202 | A | 5/2000 | Zink et al. ................... | 239/259 |
| 6,263,534 | B1 | 7/2001 | McCann et al. ............... | 15/3.5 |
| 2004/0016540 | A1 * | 1/2004 | Jarchau .................. | E21B 37/00 166/222 |
| 2007/0014502 | A1 * | 1/2007 | Dagh ...................... | F16C 33/60 384/589 |
| 2008/0035184 | A1 * | 2/2008 | Wagner .................. | B05B 3/003 134/112 |
| 2008/0304780 | A1 * | 12/2008 | Klintenstedt ............. | B04B 9/12 384/468 |
| 2009/0206557 | A1 | 8/2009 | Wright .......................... | 277/572 |
| 2011/0031325 | A1 | 2/2011 | Perkins et al. ................ | 239/122 |
| 2011/0108636 | A1 * | 5/2011 | Wright .................... | B05B 3/002 239/251 |

OTHER PUBLICATIONS

International Search Report and Written Opinion, dated Oct. 14, 2015, from corresponding International Application No. PCT/US2015/036889.

"Blue 100™ Transformer" by Brendle GmbH & Co. KG, downloaded from the Internet on Jun. 15, 2015, at http://nozzle-depot.com/contents/en-uk/d87_Seite_87.html.

Supplementary European Search Report and Opinion from corresponding European Patent Application No. 15821986.5, dated May 24, 2017.

* cited by examiner

ISOLATED BEARING VISCOUS SPEED RETARDING DEVICE FOR ROTARY NOZZLES

CROSS REFERENCE TO RELATED APPLICATIONS

This application claims the benefit of priority of U.S. Provisional Patent Application Ser. No. 62/024,408, filed Jul. 14, 2014 bearing the same title, which is hereby incorporated by reference in its entirety.

BACKGROUND OF THE DISCLOSURE

The present disclosure is directed to high pressure fluid rotary nozzle systems. In particular, embodiments of the present disclosure are directed to an apparatus for retarding the speed of rotation of such rotary nozzles.

High pressure water jet cleaning devices utilizing reaction force rotary nozzles tend to rotate at very high speeds. In many applications it is desirable to slow down such rotary nozzle speed to maximize usable lifetime of the rotary nozzle and effectively improve the cleaning efficiency of such nozzles. A speed reducing device fastened to the shaft of such rotary nozzles is often utilized to retard rotation of the nozzle. Typical viscous fluid speed reducing devices utilize a viscous fluid flowing along a tortuous flow path in a confined space around the rotating shaft to generate a drag on the nozzle shaft.

Typically the operational lifetime of the speed reducing device is limited by the longevity of the bearings and the medium such as a viscous fluid utilized to produce the speed retardation. As an example, the useful lifetime without maintenance of conventional viscous speed retarders is on the order of 40-60 device operating hours. A typical retarder device has a bearing supported shaft connected to the rotary nozzle such that the shaft rotates with the nozzle. A generally cylindrical housing contains the two support bearings supporting the rotating shaft and contains the retarding mechanism. One such retarding mechanism has a series of roller bearings immersed in a viscous fluid within the housing and between end support bearings that are also immersed in the viscous fluid. Another exemplary conventional retarder is a Warthog WG-1 by Stoneage Inc. This retarder has end support bearings sandwiching a large diameter drag sleeve fastened to or integrally formed around the shaft in the housing instead of utilizing a series of bearings in the viscous fluid. These support bearings and the drag sleeve are immersed in the viscous fluid contained within the cylindrical housing. Together the support bearings and the retarding drag sleeve are contained between two shaft seals, sealing the shaft to the housing, and preventing escape of the viscous fluid. Thus the end support bearings and the drag sleeve in the WG-1 are immersed in viscous fluid and function together to retard the speed of the rotating nozzle.

As the retarder rotates in the housing, the viscous fluid is circulated (pumped) within the fluid chamber by a helical groove around the outer surface of the drag sleeve portion of the shaft and through a series of axially extending bores through the drag sleeve portion of the shaft. Additionally, the helical groove serves to uniformly distribute the fluid above the drag sleeve and through the end bearings. In the immersed bearing system, drag is created as a function of the fluid viscosity, the bearing geometry, the surface area of the drag sleeve and the gap size between the drag sleeve and the cylindrical housing. This implementation of a viscous fluid retarder creates drag, and also eventually degrades the viscosity of the viscous fluid. Once the viscous fluid degrades during operation, the rotary nozzle speed increases substantially, frequently audibly indicating to an operator that the viscous fluid needs to be changed. The retarder and nozzle then must be removed from service, disassembled, cleaned and flushed, reassembled and new viscous fluid installed. This is inconvenient to the operator, takes maintenance down time and can result in increased maintenance costs over the life of the tool. Therefore what is needed is a viscous retarder device that has a substantially improved operational lifetime in order to solve these problems.

SUMMARY OF THE DISCLOSURE

The present disclosure directly addresses such needs. An apparatus in accordance with the present disclosure is a speed reducing or limiting device for a rotary nozzle that exhibits an operational lifetime between maintenance periods of many times that of conventional viscous retarder devices. This remarkable longevity increase is achieved by isolating the shaft support bearings from the viscous fluid in the retarding cavity of the device.

An exemplary embodiment of a retarder in accordance with the present disclosure includes a hollow generally cylindrical housing that carries an elongated shaft having a retarding portion between forward and rear support bearings. Each of the support bearings is isolated from the retarding portion of the elongated shaft within the housing by an annular seal. A conventional viscous fluid material such as gear oil or silicone fills the housing around the retarding portion of the shaft between the two annular seals.

Further features, advantages and characteristics of the embodiments of this disclosure will be apparent from reading the following detailed description when taken in conjunction with the drawing figures.

DETAILED DESCRIPTION

Figure 1:
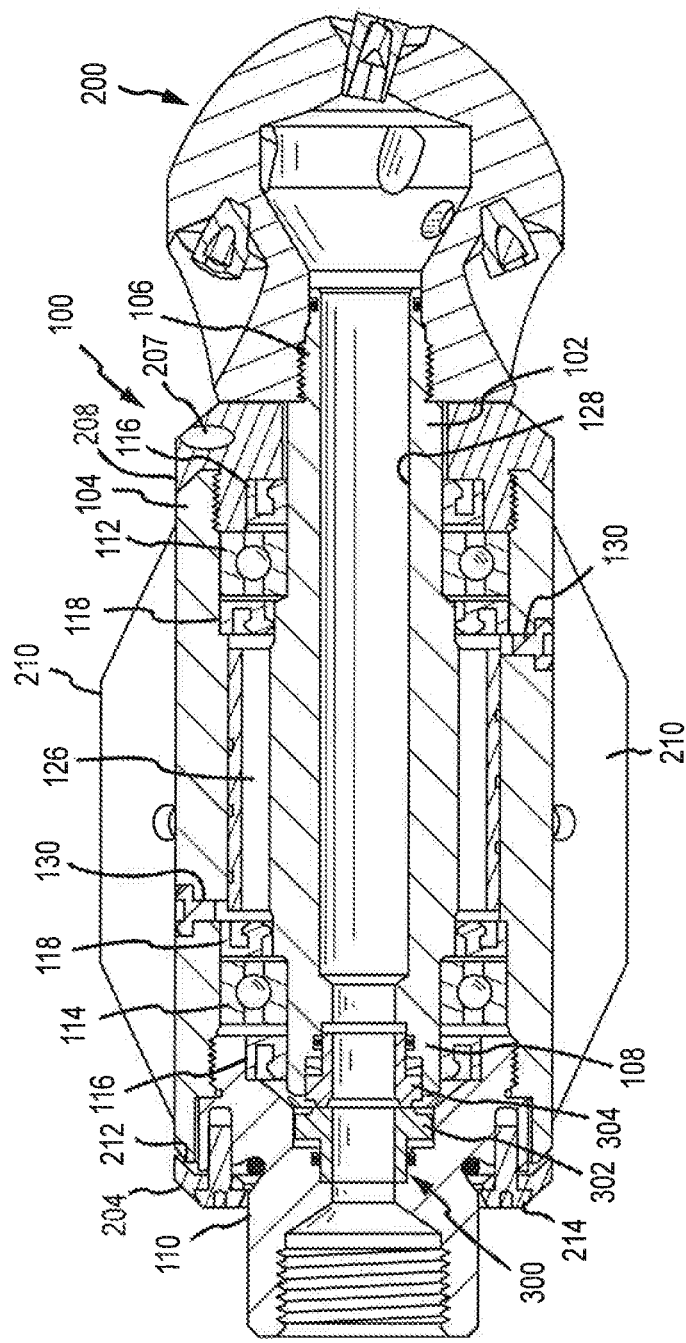
FIG. 1 is an axial cross sectional view through a retarder device in accordance with the present disclosure fastened to a rotary nozzle head.

An exemplary embodiment of a retarder device 100 in accordance with the present disclosure connected to a rotary nozzle 200 is shown in sectional view in FIG. 1. The retarder device 100 includes a tubular shaft 102 carried within a generally cylindrical tubular housing 104. The shaft 102 has a distal end 106 fastened to the nozzle 200 and an opposite end 108 coupled with an inlet nut 110 that is connected to a high pressure fluid hose (not shown).

This cylindrical housing 104 also carries within it a first support bearing 112 and a second support bearing 114 which together rotatably support the shaft 102. Each of the bearings 112 and 114 is sandwiched between a pair of shaft seals 116 and 118.

The shaft 102 also has a retarding sleeve portion 120 between the two shaft seals 118. This sleeve portion 120 is preferably an integral part of the shaft 102 and has a large diameter outer cylindrical surface 122 sized to closely fit within the housing 104. This surface 122 has a peripheral helical groove 124 that extends from one end to the other of the sleeve portion 120. The sleeve portion 120 further has a plurality of axially extending bores 126 spaced around the axial bore 128 through the shaft 102.

The sleeve portion 120 is captured on the shaft 102 within the housing 104 by the front and rear inner seals 118. A pair of threaded ports 130 permits filling the space within the housing 104, and around and within the sleeve portion 120, with a high viscosity fluid such as silicone fluid having a kinematic viscosity within a range of 200 to 60,000 cSt, and more preferably within a range of 200 cSt to 15,000 cSt. The speed range of the retarder 100 is determined by the viscous fluid viscosity and the high pressure fluid applied to the nozzle 200. The retarding capacity of the retarder 100 is determined by the viscous fluid viscosity, the cylindrical surface 122 length and outer diameter, and the gap between the cylindrical surface 122 and the housing 104. This retarding capacity serves to resist the torque generated by the nozzle 200 when high pressure fluid such as water is applied. The resulting net forces dictate the rotational speed of the nozzle 200 relative to the retarder 100. There are additional secondary retarding forces, operating torque from the high pressure seal, intrinsic bearing drag and shaft seal drag. However, these forces are essentially fixed as a function of the design and the reasonable life of the related parts. These forces are intended to be dominated by the retarding mechanism and the nozzle torque.

The front and rear outer seals 116 keep water and external contaminants out of the bearings 112 and 114. The inner seals 118 keep viscous retarder fluid out of the bearings 112 and 114. Separation of the bearings 112 and 114 from the viscous fluid accomplishes two things. First, the bearings 112 and 114 are free to rotate the shaft 102 without drag of the viscous fluid and utilizing their own optimal lubricating medium, which tends to increase the bearing lifetime. Second, the seals 118 prevent the bearings from degrading the viscous fluid due to bearing shear forces exerted on the viscous fluid. An alternative embodiment may be implemented utilizing sealed bearings to isolate the bearing components and lubricant from the viscous fluid and retarding mechanism.

The bearings 112 and 114 may be sealed bearings. Alternatively open bearings may be utilized that are packed with grease. Grease zerk fittings or oil bath fittings could also be installed in the housing 104 to accommodate such an open bearing configuration.

The isolated bearing innovation of the present disclosure resulted from lengthy testing performed on conventional viscous fluid retarders. A custom made tool tester was utilized to control various permutations of input torque, speed and temperature on a conventional retarder configuration. It was found that the conventional retarder configuration lasts, on average, about 40 hours on this tester. The failure mode was a speed runaway resulting from viscosity change in the fluid. By analyzing the viscous fluid before and after speed runaway, it was learned that the rolling contact of the bearings shears the molecules of the silicone viscous fluid at a rate that is a function of the rotary nozzle speed. This shearing results in a steady and predictable reduction in fluid viscosity and relatedly an increase in tool rotation speed.

By separating the bearings 112 and 114 from the viscous fluid via an extra set of inner seals 118 and containing each bearing 112 and 114 also with a set of shaft outer seals 116, an average of 1000 hours or more of useful lifetime between maintenance intervals for the retarder 100 was established based on test and measurements performed on the aforementioned tool tester. Such a drastic improvement of lifetime manifests a gross improvement in the tool's performance.

More consistent, sustainable rotational speed can also be achieved by removing the primary means for viscous fluid degradation (bearings) from the retarding mechanism. The rotational speed becomes predictable as a function of part geometry and fluid viscosity. Therefore the retarder 100 can be characterized such that users can install fluid of different viscosity (within a recommended range of viscosities) to achieve different rotational speeds for a given nozzle rotational torque. Removing the bearings from the braking mechanism also permits the retarder to reliably function at higher speeds. In the prior device, the immersed bearings served to multiply harmful shear characteristics due to their geometry and higher speed operation could not be sustained due to the revolution dependent breakdown of fluid viscosity. Removing the bearings from the retarding mechanism results in more consistent retarding. When the mechanism is reduced to a drag sleeve, cylindrical housing and viscous fluid, the retarding capability is more reliable and predictable.

Another improvement in the speed retarder 100 in accordance with the present disclosure is the inclusion of replaceable centralizer vanes 210. Conventional retarder designs such as Stoneage's WG retarder devices have historically had radial fins welded to a separate cylindrical sleeve that installs to the exterior surface of the housing of the retarder. These radial fins must be replaced together with the cylindrical sleeve.

Figure 2:
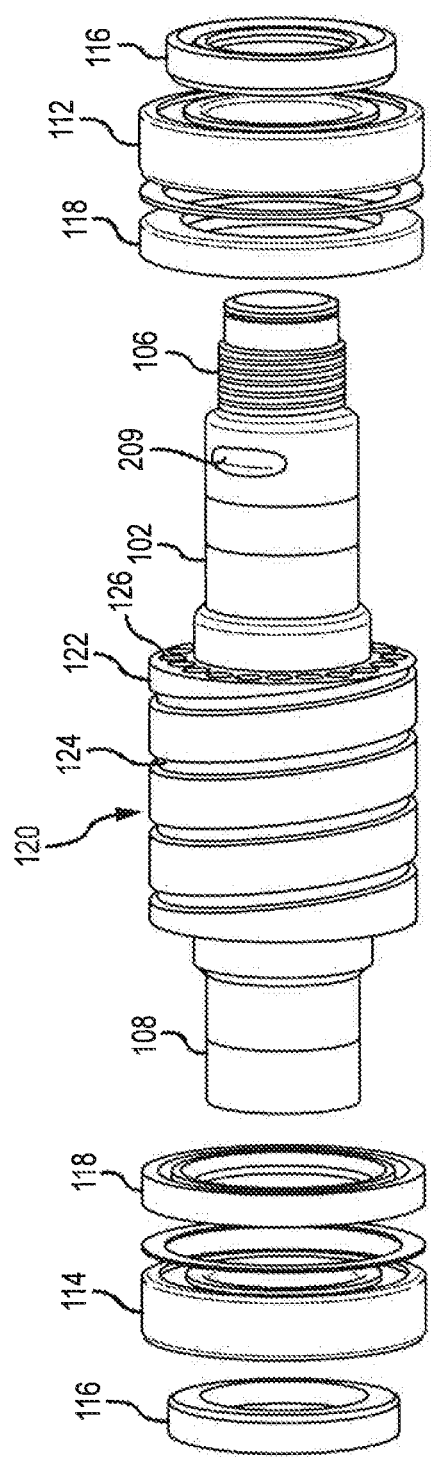
FIG. 2 is an exploded perspective view of the retarder device shown in FIG. 1 separated from the rotary nozzle.
Figure 3:
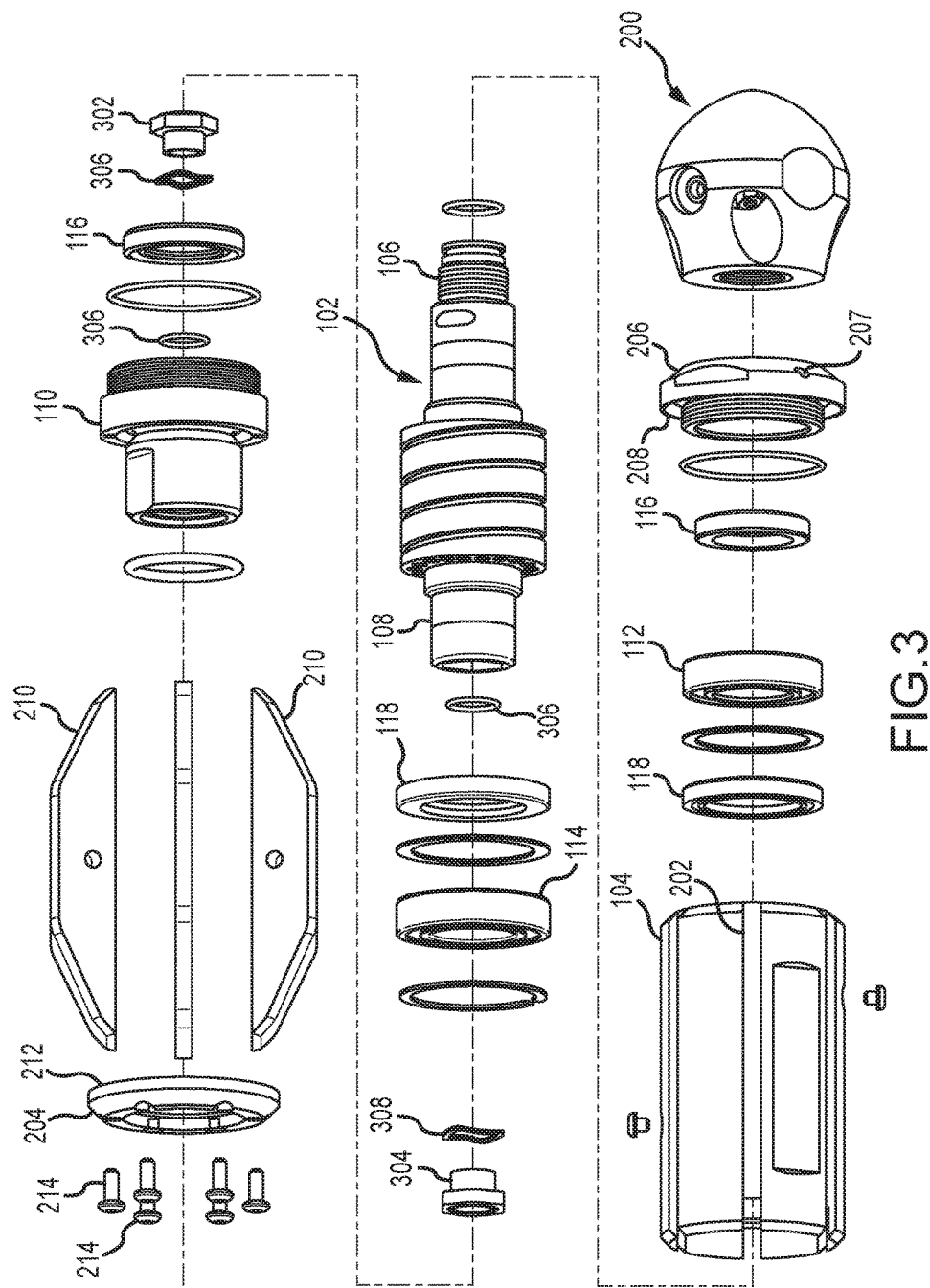
FIG. 3 is an exploded perspective view of the retarder device and nozzle head shown in FIG. 1 showing each subcomponent in assembly sequence.

In the retarder 100 shown in FIGS. 1-3, the housing 104 is a cylindrical tube provided with six axially extending exterior slots 202. The rear end of the housing 104 is closed by the threaded inlet nut 110. The front end of the housing 104 is closed by a front end nut 206. The front end nut has a peripheral annular rearwardly facing recess 208, shown in FIGS. 1 and 3. The inlet nut 110 closing the housing 104 is fitted with a removable annular rear end cap 204. This rear end cap 204 similarly has a forwardly facing annular recess 212 (visible in FIG. 1. The rear end cap 204 is fastened to the inlet nut 110 by a series of six threaded fasteners 214 such as Torx® bolts.

Each of the vanes 210 is a plate having a generally equilateral trapezoidal shape preferably made of a hardened steel material. Vanes made of a plastic or composite material may alternatively be utilized. These vanes 210 are captured within the slots 202 and the vane ends are captured within the recesses 208 and 212. The vanes 210 may be removed and replaced without disassembly of the retarder 100, simply by removing the fasteners 214 and removing the end cap 204. The vanes 210 can then simply slip out of the slots 202 and a new vane or vanes 210 installed.

Another improvement in the speed retarder 100 in accordance with the present disclosure is the inclusion of a hardened face seal pair 300 between the inlet nut 110 and the rear end 108 of the rotary shaft 102. This seal pair 300 comprises two elements: a nut flanged tubular high pressure rear face seal 302 that fits within a hexagonal recess in the inlet nut 110, and a nut flanged tubular shaft high pressure front face seal 304 that fits within a complementary hexagonal recess in the proximal end 108 of the shaft 102. These seals 302 and 304 are held in their respective recesses via O-rings 306 and biased toward each other via a wave spring 308 around the stem portion of each seal 302 and 304. These high pressure seals permit rotation of the shaft 102 relative to the inlet nut 110 with minimal high pressure water leakage.

The seal pair 300 permits the inlet nut 110 to be removed from the assembled retarder 100 for high pressure face seal 300 maintenance and/or centralizer vane 210 replacement without disturbing the bearing 114 and inner seal 118 and thus violating the integrity of the viscous fluid cavity within the housing 104 containing the viscous fluid. Similarly, the front end nut 206 may be removed from the housing 104 without violating the integrity of the bearing 112, inner seal 118, and integrity of the viscous fluid cavity within the housing 104.

Another improvement in the speed retarder of the present disclosure is a series of features designed to permit removal of the nozzle 200 without any additional disassembly of the retarder 100. A hex key, Torx® tool, rod or screwdriver having the appropriate shaft diameter can be inserted into the retarder 100 front end nut 206 at the hole 207. When the shaft 102 is properly clocked relative to the front end nut 206, the inserted tool will engage a slot 209 in the shaft 102 and lock the shaft 102 to the front end nut 206. Once the tool has been properly inserted and shaft 102 locked, an open end wrench can be applied to the flats on the front end nut 206 and similarly to the flats on the nozzle 200 to remove the nozzle 200 from the shaft 102 of the retarder 100. An entry portion of the hole 207 may be threaded and plugged with a complementary set screw to prevent debris from filling and stopping the shaft from rotation during tool operation.

Many changes may be made to the device, which will become apparent to a reader of this disclosure. For example, the helical groove 124 may have an Acme thread profile, a buttress thread profile, or a 55 degree or 60 degree thread profile. The seals 302 and 304 may have a shape other that hexagonal as described above. They may have any shape to fit in complementary recesses in the inlet nut 110 or in the proximal end 108 of the shaft 102. Although the rear face of the nozzle 200 is shown flush with the front face of the nut 208, there is a gap therebetween as the nozzle 200 rotates with the shaft 106. The nozzle 200 may be further spaced from the nut 208 than as shown and its rear face may be tapered outward so as to prevent collection of debris between the two rotating surfaces. All such changes, alternatives and equivalents in accordance with the features and benefits described herein, are within the scope of the present disclosure. Any or all of such changes and alternatives may be introduced without departing from the spirit and broad scope of my disclosure and invention as defined by the claims below and their equivalents.

What is claimed is:

1. A speed retarding device for a rotary nozzle comprising:
   a hollow cylindrical housing;
   a rotatable tubular shaft rotatably carried by the housing, the shaft having a drag sleeve portion in the housing and having a shaft end extending through at least one end of the housing, wherein the shaft end is adapted to receive a rotary nozzle thereon;
   a pair of lubricated support bearings sandwiching the drag sleeve portion of the shaft in the housing;
   an annular axial inner seal between each of the support bearings and the drag sleeve portion, wherein the inner seals sandwich the drag sleeve portion therebetween and isolate the drag sleeve portion from the support bearings, and wherein the inner seals, the housing and the drag sleeve portion define a cavity within the housing; and
   a viscous fluid confined within the cavity.

2. The retarding device according to claim 1 further comprising an outer annular seal on the shaft adjacent to each support bearing whereby each support bearing is sandwiched between inner and outer annular seals in the housing and separated from the viscous fluid in the cavity.

3. The retarding device according to claim 1 further comprising a plurality of removable centralizing vanes radially extending outward from the housing.

4. The retarding device according to claim 3 wherein the housing has a plurality of axially extending outwardly open slots each receiving one of the plurality of removable centralizing vanes therein.

5. The retarding device according to claim 1 further comprising the shaft having an inner end in the housing facing an inlet nut threaded into one end of the hollow cylindrical housing and a high pressure face seal assembly captured between the inlet nut and the inner end of the shaft.

6. The retarding device according to claim 5 wherein the high pressure face seal assembly comprises a pair of nut flanged tubular face seals.

7. The retarding device according to claim 6 wherein one face seal of the pair of face seals is a nut flanged tubular rear face seal received within a recess in the inlet nut and the other one face seal of the pair of face seals is a nut flanged tubular front face seal received within a recess within a rear end of the tubular shaft.

8. A speed retarding device for a rotary nozzle comprising:
   a hollow cylindrical housing;
   a rotatable tubular shaft rotatably carried by the housing, the shaft having a drag sleeve portion in the housing and having a shaft end extending through at least one end of the housing, wherein the shaft end is adapted to receive a rotary nozzle thereon;
   a pair of lubricated support bearings supporting and sandwiching the drag sleeve portion of the shaft between the bearings in the housing;
   an annular axial inner seal between each of the support bearings and the drag sleeve portion isolating the drag sleeve portion from the support bearings, wherein the inner seals, the housing and the drag sleeve portion define a cavity within the housing;
   a viscous fluid confined within the cavity; and
   a plurality of centralizing vanes radially extending outward from the housing.

9. The device according to claim 8 wherein the centralizing vanes are removable.

10. The retarding device according to claim 9 wherein each of the plurality of centralizing vanes is slidably captured within a slot formed in the exterior surface of the housing.

11. The retarding device according to claim 10 wherein the centralizing vanes are made of a plastic material.

12. The retarding device according to claim 8 further comprising an outer annular seal on the shaft adjacent to each support bearing whereby each support bearing is sandwiched between inner and outer annular seals in the housing and separated from the viscous fluid in the cavity.

13. The retarding device according to claim 8 further comprising a plurality of removable centralizing vanes radially extending outward from the housing.

14. The retarding device according to claim 13 wherein the housing has a plurality of axially extending outwardly open slots each receiving one of the plurality of removable centralizing vanes therein.

15. The retarding device according to claim 8 further comprising the shaft having an inner end in the housing facing an inlet nut threaded into one end of the hollow cylindrical housing and a high pressure face seal assembly captured between the inlet nut and the inner end of the shaft.

16. In a high pressure water blasting tool assembly having a rotatory nozzle for cleaning inside surfaces of a piping system, a speed retarding device connected between a hose and the rotary nozzle, the retarding device comprising:
- a hollow cylindrical housing;
- a rotatable tubular shaft rotatably carried by the housing, the shaft having a drag sleeve portion in the housing and having a shaft end extending through at least one end of the housing, wherein the shaft end is adapted to receive a rotary nozzle thereon;
- a pair of lubricated support bearings on the shaft supporting and sandwiching the drag sleeve portion of the shaft in the housing;
- an annular axial inner seal between each of the support bearings and the drag sleeve portion isolating the drag sleeve portion from the su ort bearings, wherein the inner seals, the housing and the drag sleeve portion define a cavity within the housing around the drag sleeve portion;
- a viscous fluid confined within the cavity; and
- an outer axial annular seal on the shaft adjacent to each support bearing whereby each lubricated support bearing is sandwiched between inner and outer annular seals in the housing and separated from the viscous fluid in the cavity.

17. The retarding device according to claim 16 wherein the drag sleeve portion has a central bore, at least one outwardly open helical groove therearound and a plurality of axially extending bores around the central bore.

18. The retarding device according to claim 16 further comprising a plurality of removable centralizing vanes extending radially outward from the housing.

19. The retarding device according to claim 18 wherein the housing has a plurality of axially extending outwardly open slots each receiving one of the plurality of removable centralizing vanes therein.

20. The retarding device according to claim 16 further comprising the shaft having an inner end in the housing facing an inlet nut threaded into one end of the hollow cylindrical housing and a high pressure face seal assembly captured between the inlet nut and the inner end of the shaft.

* * * * *

UNITED STATES PATENT AND TRADEMARK OFFICE
CERTIFICATE OF CORRECTION

PATENT NO. : 10,118,185 B2
APPLICATION NO. : 14/745762
DATED : November 6, 2018
INVENTOR(S) : Joseph A. Schneider Page 1 of 1

It is certified that error appears in the above-identified patent and that said Letters Patent is hereby corrected as shown below:

In the Claims

In Column 7, Line 18, in Claim 16, delete "su ort" and insert -- support --, therefor.

Signed and Sealed this
Twenty-third Day of April, 2019

Andrei Iancu
*Director of the United States Patent and Trademark Office*